United States Patent [19]
Thimmesch

[11] Patent Number: 5,595,164
[45] Date of Patent: Jan. 21, 1997

[54] LOW PROFILE INTAKE MANIFOLD HEATER

[75] Inventor: Jan P. Thimmesch, Eden Prairie, Minn.

[73] Assignee: Phillips & Temro Industries Inc., Eden Prairie, Minn.

[21] Appl. No.: 493,486

[22] Filed: Jun. 22, 1995

[51] Int. Cl.[6] .................................................... F02M 31/00
[52] U.S. Cl. ............................................................ 123/549
[58] Field of Search ............................ 123/549; 219/205, 219/206, 207

[56] References Cited

U.S. PATENT DOCUMENTS

| 909,898 | 1/1909 | Hertzberg et al. . |
| 1,068,322 | 7/1913 | Church et al. . |
| 1,136,845 | 4/1915 | Tate . |
| 1,369,551 | 2/1921 | Schmid . |
| 1,456,018 | 5/1923 | Wiegand . |
| 1,724,481 | 8/1929 | Heginbottom et al. . |
| 1,931,379 | 10/1933 | Graziano . |
| 1,931,837 | 10/1933 | Belanger . |
| 2,115,634 | 4/1938 | Kiesel . |
| 2,177,840 | 10/1939 | Roualet . |
| 2,668,900 | 2/1954 | Kwartz . |
| 3,088,447 | 5/1963 | Henderson . |
| 3,492,457 | 1/1970 | Subt . |
| 3,625,190 | 12/1971 | Boissevain . |
| 3,892,215 | 7/1975 | Hickling et al. . |
| 4,020,812 | 5/1977 | Hayward . |
| 4,106,454 | 8/1978 | Henlis . |
| 4,108,125 | 8/1978 | Marcoux et al. . |
| 4,363,958 | 12/1982 | Kobayashi et al. . |
| 4,395,994 | 8/1983 | Goto et al. ........................ 123/549 |
| 4,463,721 | 8/1984 | Hayashi et al. . |
| 4,501,255 | 2/1985 | Van Der Ploeg et al. . |
| 4,651,702 | 3/1987 | Nara et al. ........................ 123/549 |
| 4,667,645 | 5/1987 | Gluckman . |
| 4,685,437 | 8/1987 | Tanaka et al. ................... 123/549 |
| 4,870,249 | 9/1989 | Kayanuma et al. .............. 123/549 |
| 4,944,260 | 7/1990 | Shea et al. . |

FOREIGN PATENT DOCUMENTS 648536  12/1928  France .
62-91649  4/1987  Japan .

Primary Examiner—Marguerite McMahon
Attorney, Agent, or Firm—Harness, Dickey & Pierce, P.L.C.

[57] ABSTRACT

A heating device for use in the cylinder head of an internal combustion engine for heating the airflow entering the cylinder head from the intake manifold. The improved heating device includes an electric heating element coupled to a frame which includes a perimeter mounting member and a recessed body portion. An aperture is formed in the recessed body portion to accommodate a terminal assembly that is adapted to pass through said aperture and a bore formed in the cylinder head. A power source may be electrically connected to the portion of the terminal assembly that extends beyond the cylinder head. The improved heating device allows the heating element to be recessed into the cylinder head thereby permitting the cylinder intake airflow to be heated without significantly increasing the distance between engine parts located above and below the heater. Additionally, the electric connection to the heating element may be located remote from sealing gaskets used to mount the heating device frame to the cylinder head thereby reducing the risk of electrical shorts due to gasket aging.

23 Claims, 5 Drawing Sheets

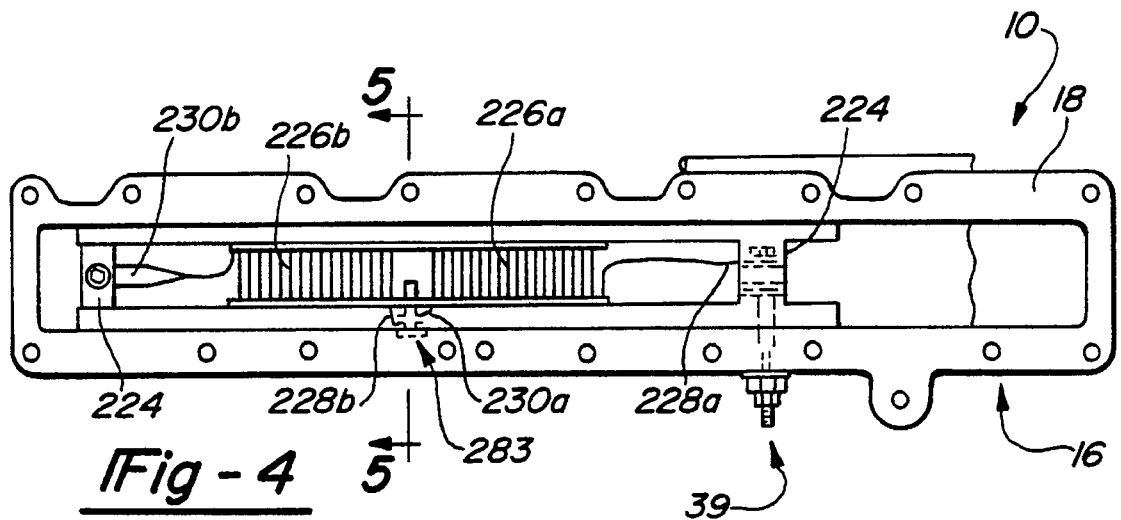
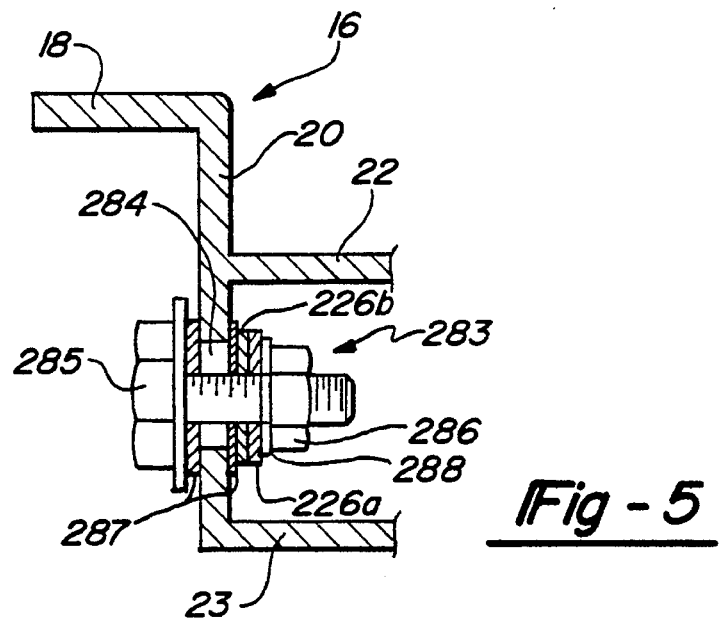

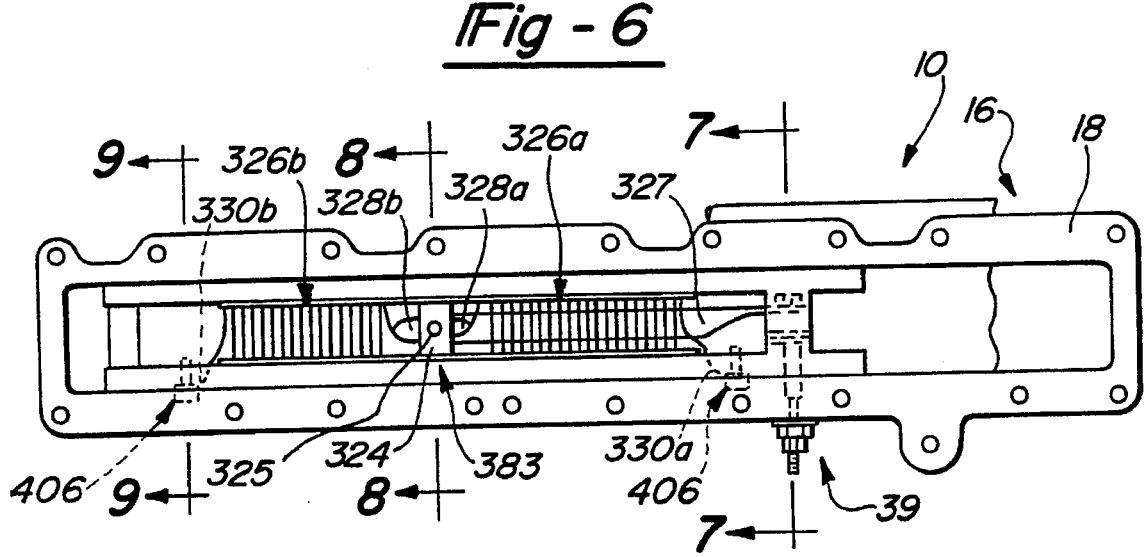

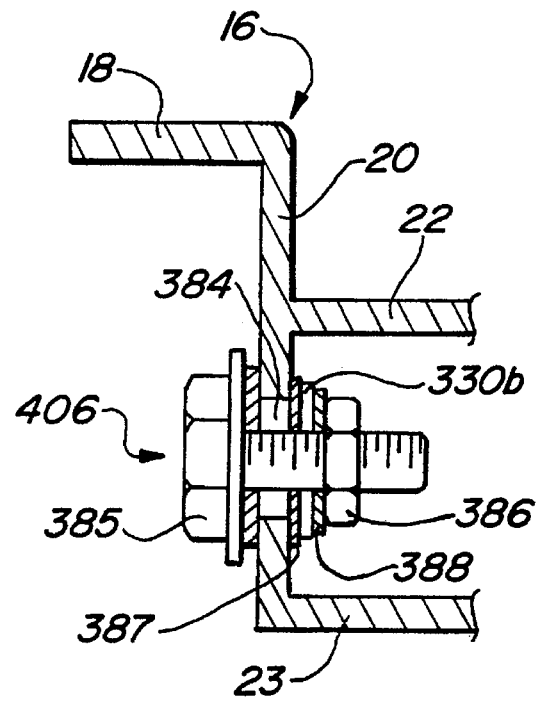
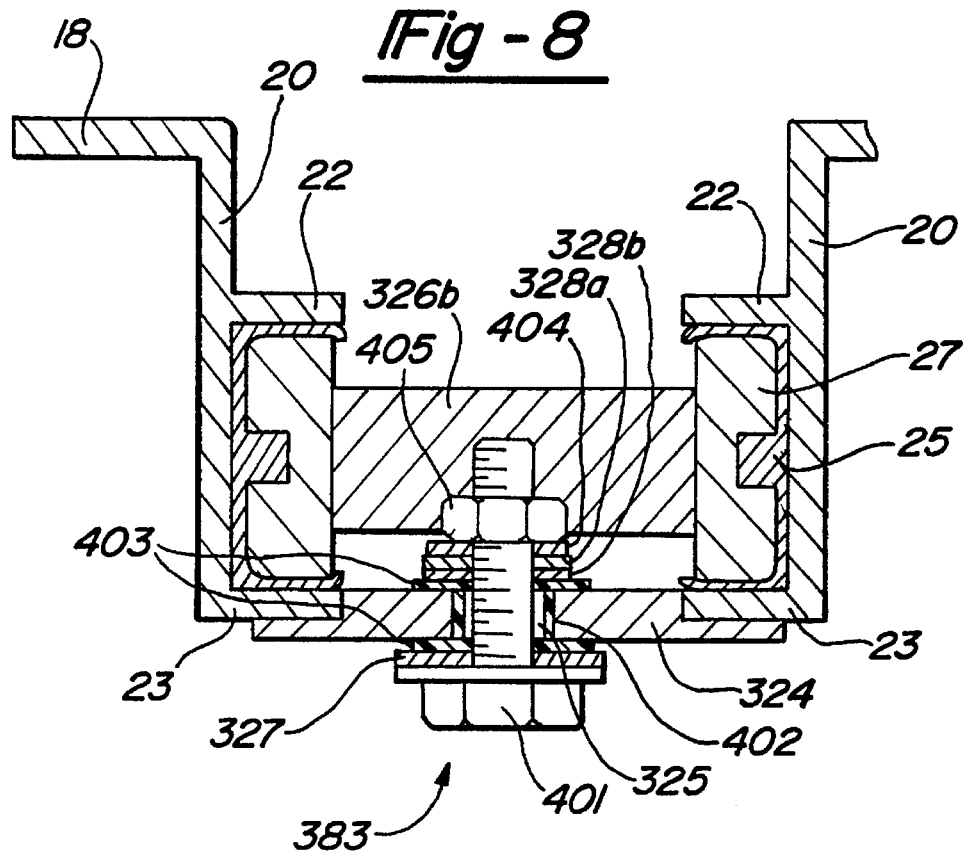

5,595,164

1

LOW PROFILE INTAKE MANIFOLD HEATER

BACKGROUND OF THE INVENTION

1. Technical Field

This invention generally relates to an apparatus for heating the air/fuel mixture entering the cylinder of an internal combustion engine. More particularly, the invention relates to an electric heating element recessed into a cylinder head and electrically connected to a power source by a terminal assembly. The terminal assembly is coupled to the heating element and passes through an aperture formed in the cylinder head.

2. Discussion

The prior art has addressed the desirability of heating the environment of the intake manifold including the air/fuel mixture exiting the carburetor of an internal combustion engine in order to increase fuel economy and decrease pollutant discharge. One type of intake heating device generally includes a pair of gaskets surrounding a heating coil or grid disposed between the carburetor and the air intake manifold as shown in U.S. Pat. No. 4,020,812 to Hayward and U.S. Pat. No. 4,106,454 to Henlis. Unfortunately, gasket wear or aging may eventually lead to contact between the contacts of the heater element and either the intake manifold or the carburetor thereby shorting the electric circuit through the heater element. As gasket aging is partially attributable to the heat generated by the contacts adjacent to the gaskets, the power and voltage used in the heating system may be limited by concerns over the useful life of the gaskets.

Stand alone heating devices such as the diesel fuel heating plate shown in U.S. Pat. No. 4,501,255 to VanDerPoleg et al. have also been developed. While these designs may eliminate the problem of shorting due to gasket wear by relocating the electric contacts of the heating device, the height of the stand alone units effectively increase the distance between engine elements located above and below the heater. Accordingly, wires, hoses, tubes and the like such as those used in fuel lines, intake air plumbing and turbocharger and aftercooler assemblies often must be lengthened to accommodate the increased distance. Thus, it was required to maintain an expanded inventory of such wires, hoses, tubes and the like to accommodate engines with and those without the stand alone heating devices.

One object of the present invention is to provide an improved electric heater device which eliminates the potential for short circuiting due to gasket wear.

Another object of the present invention is to allow increased power transmission through the heater element thereby increasing the capacity of the element to heat the air passing therethrough.

It is an additional object of this invention to reduce the effective height of the heater device thereby eliminating the need to maintain an expanded inventory of connecting wires, hoses, tubes and the like.

SUMMARY OF THE INVENTION

The invention provides an electric heater device mounted in a recessed portion of a heater mounting frame. The frame includes a perimeter mounting member adapted to cooperate with the cylinder head to support the recessed portion of the frame and the attached heater element. A pair of gaskets provide a seal between the mounting member and the surrounding cylinder head and cover. The heater device is electrically connected to a power source through a terminal assembly connected to one end of the heater device. The heater device is recessed into the cylinder head and the terminal assembly passes through a bore formed in the cylinder head.

In the improved heater device, the terminal assembly supplying power to the heating element is isolated from the sealing gaskets by the mounting frame. Thus, concerns over the useful life of the sealing gaskets are minimized and the power supplied to the heating element may be increased because the gaskets are located remote from the heating element and failure of the gaskets will not short the circuit. Further, the recessed nature of the heating device within the cylinder head minimizes the height increase resulting from the heating element thereby effectively eliminating the need to maintain an expanded inventory of wires, hoses, tubes and the like.

BRIEF DESCRIPTION OF THE DRAWINGS

The objects and features of this invention will become further apparent from a reading of the following detailed description taken in conjunction with the drawings, in which:

FIG. 4 is a top view of a second embodiment of the heating device disposed in a cylinder head wherein the heating device includes two heating elements connected in series;

FIG. 5 is a partial sectional view taken at the location 5—5 shown in FIG. 4 and illustrating the means for coupling the heating elements in series;

FIG. 6 is a top view of a third embodiment of the heating device disposed in a cylinder head illustrating two heating elements connected in parallel;

FIG. 7 is a sectional view taken at the location 7—7 shown in FIG. 6 and illustrating the terminal assembly connection to the heating device frame;

FIG. 8 is a sectional view taken at the location 8—8 shown in FIG. 6 and illustrating the coupling means electrically connecting the heating elements; and FIG. 9 is a partial sectional view taken at the location 9—9 shown in FIG. 6 and illustrating the connection of the heating elements to the heating device frame.

DETAILED DESCRIPTION OF THE PREFERRED EMBODIMENT

Figure 1:
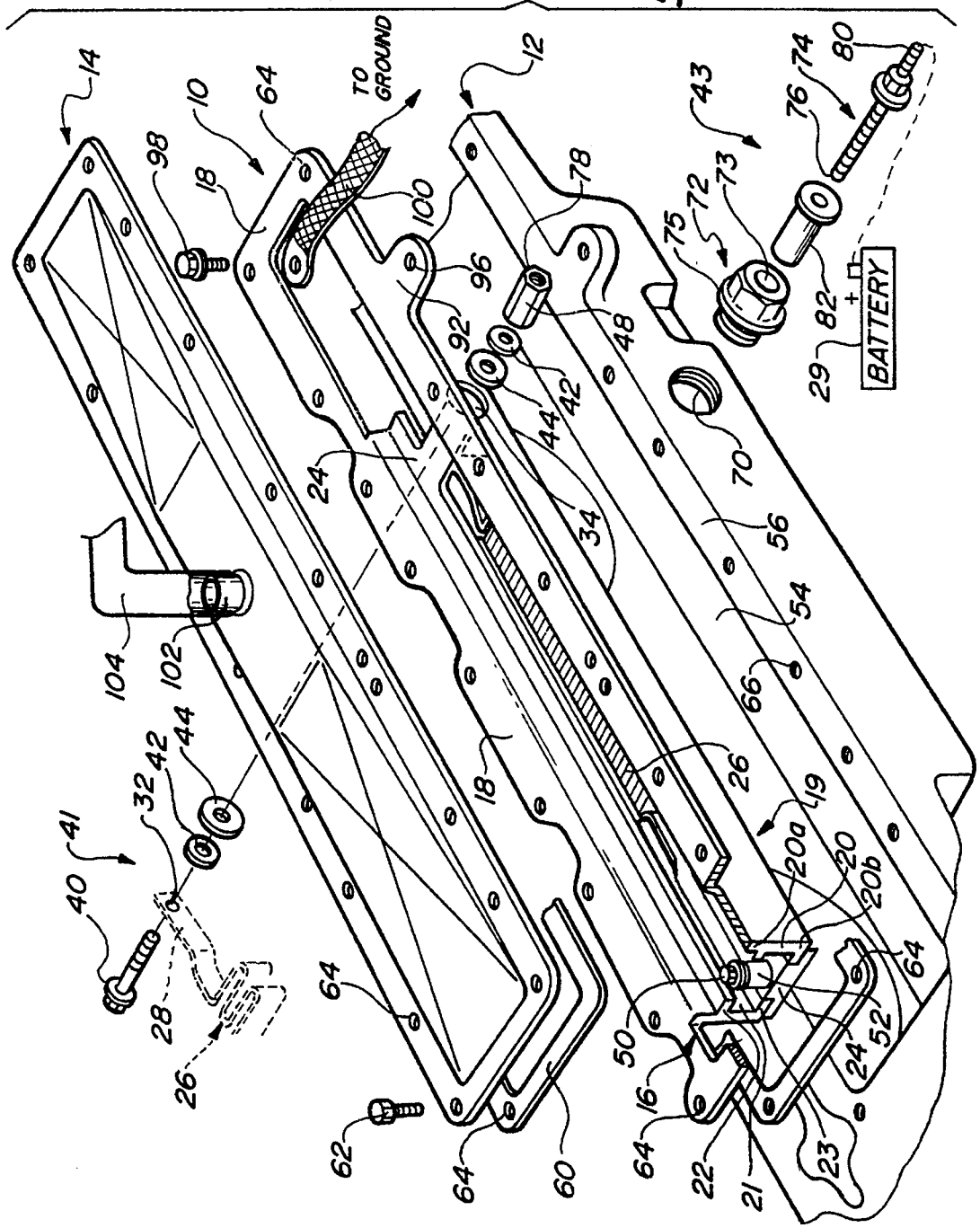
FIG. 1 is an exploded perspective view of a first embodiment of the improved heating device as assembled and mounted to a cylinder head in an internal combustion engine.
Figure 2:
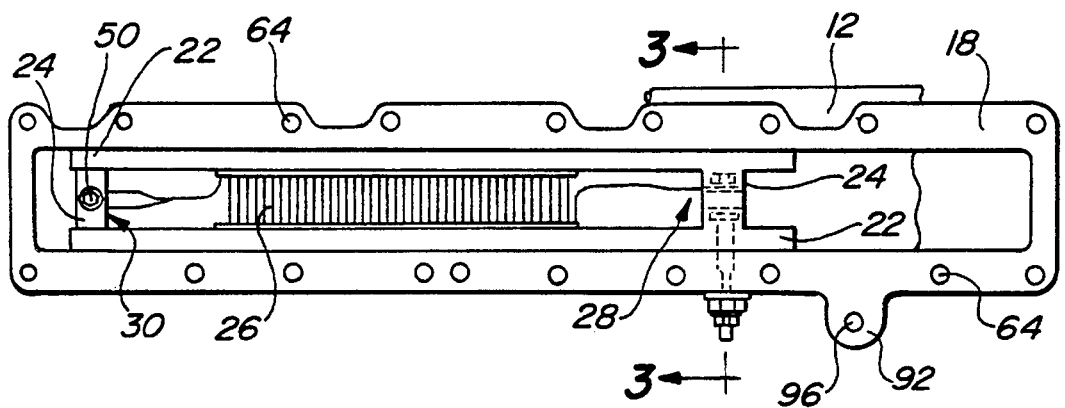
FIG. 2 is a top view of the heating device disposed in a cylinder head in accordance with the first embodiment of the present invention.

With reference to FIGS. 1 and 2, the invention disclosed herein includes a low profile heating device 10 coupled to a cylinder head 12 and a cover plate 14. Specifically, the heating device 10 includes a frame 16 having a flange or perimeter mounting member 18 and recessed body portion 19 having side walls 20. In the preferred embodiment of the present invention frame 16 has a block-like or parallelepiped shape with side walls 20 extending substantially perpendicular below perimeter mounting member 18 which, in turn, extends horizontally beyond side walls 20 as best seen in FIG. 1.

Figure 3:
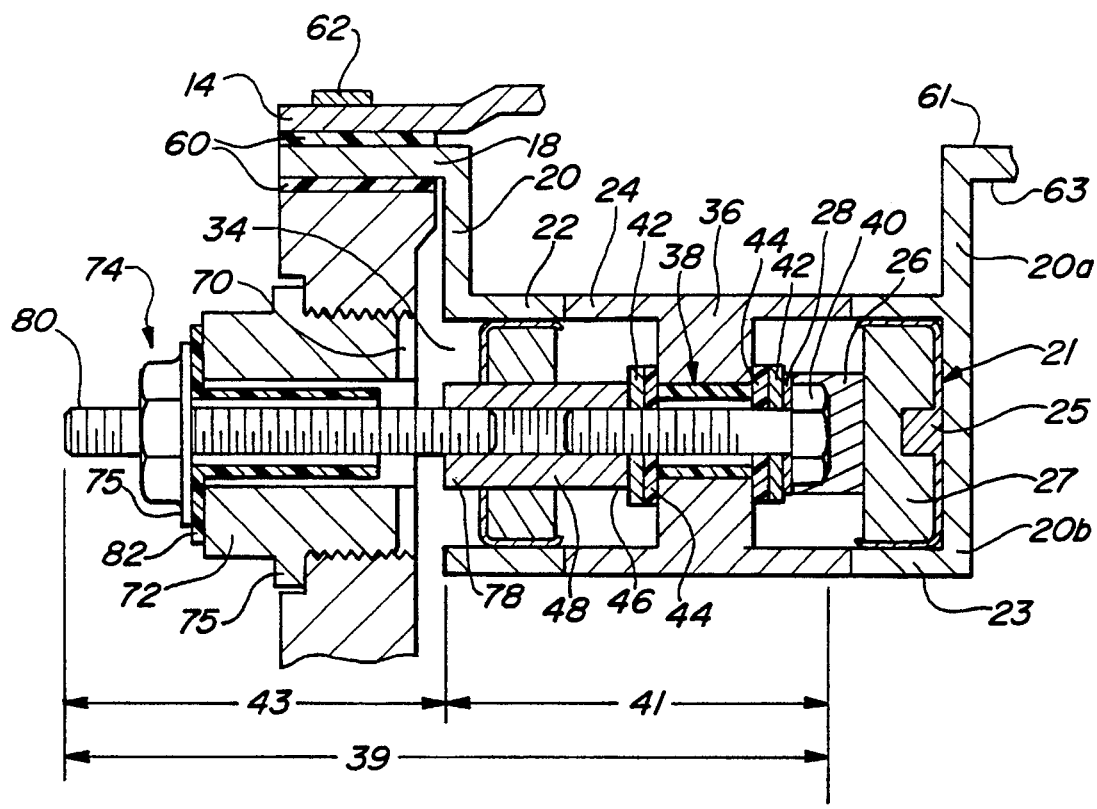
FIG. 3 is a sectional view taken at the location 3—3 shown in FIG. 2 and illustrating the terminal assembly connection to the heating device through the cylinder head.

Side walls 20 may include an upper edge 20a and a lower portion 20b (FIGS. 1 and 3), upper and lower transversely projecting hubs 22 and 23, respectively, and a plurality of transverse support members 24. As best seen in FIG. 3, hubs 22 and 23 cooperate with side walls 20 to form a C-channel 21 in which an inner C-shaped mounting element 25 is disposed. Insulating material 27 is shaped to engage mounting element 25 and heating element 26, whereby heating element 26 is secured within C-shaped mounting element 25. It will be appreciated by those skilled in the art that a variety of mounting frames may be formed through a variety of processes to provide recessed mounting of the heating device as hereinafter described without departing from the spirit of this invention. Perimeter mounting member 18, side walls 20, hubs 22 and 23 and transverse support members 24 may be separately machined and connected to one another through welding or other appropriate methods or the frame may be formed through stamping.

In the embodiment shown in FIGS. 1–3, first end 28 of heating element 26 is coupled to vertical support member 36 (FIG. 3) by a terminal assembly 39 while second end 30 of heating element 26 is attached to frame 16 at transverse support member 24. As hereinafter described, first end 28 is connected to the positive terminal of a power source 29 (e.g., battery) while second end 30 operates as the grounding connection for heater element 26 whereby a circuit is formed to conduct electricity through heater element 26.

As shown in FIGS. 1 and 3, terminal assembly 39 generally includes a first portion 41 for coupling heating element 26 to frame 16 during the assembly of heating device 10 and a second portion 43 electrically connecting heating element 26 to power source 29 after heating device 10 is installed in cylinder head 12. Specifically, an aperture 32 is formed in first end 28 of heating element 26 to accommodate first portion 41 of terminal assembly 39. First portion 41 includes a threaded bolt 40 sized to pass through a mounting opening 38 formed in vertical support member 36 and threadably engage first end 46 of union nut 48. Insulating material 44 electrically isolates bolt 40 from vertical support member 36 of frame 16. Thus, first portion 41 of terminal assembly 39 preferably consists of bolt 40, washers 42, insulating material 44 and union nut 48 which cooperate to couple first end 28 of heating element 26 to vertical support member 36 of frame 16. Similarly, second end 30 of heating element 26 is coupled to transverse support member 24 as shown in FIGS. 1 and 2 by threaded bolt 50 and spacers 52 which cooperate with a threaded opening (not shown) in transverse support member 24 and an aperture (not shown) in second end 30 of heating element 26.

The heating device is assembled as heretofore described and then disposed within and mounted to cylinder head 12. Cylinder head 12 is adapted to include an intake opening 54 and a mounting surface 56. As shown in FIG. 1, a pair of gaskets 60 are provided which cooperate with upper and lower surfaces 61 and 63, respectively, of perimeter mounting member 18 to prevent air and/or foreign matter from entering or exiting the cylinders other than through inlet means 102. Perimeter mounting plate 18, cover plate 14 and gaskets 60 each include a plurality of apertures 64 sized to accommodate mounting bolts 62. Further, threaded bores 66 are formed in cylinder head 12 to threadably engage mounting bolts 62 and secure cover plate 14, gaskets 60 and perimeter mounting member 18 of frame 16 to cylinder head 12.

Once securely recessed into cylinder head 12, second portion 43 of terminal assembly 39 is connected to first portion 41 through an aperture 34 formed in recessed body portion 19 thereby allowing heating device 10 to be connected to power source 29. In the preferred embodiment, cylinder head 12 is provided with a threaded bore 70 located so as to align with aperture 34 and sized to cooperatively engage an externally threaded bushing 72. Bushing 72 preferably includes internal cylindrical opening 73 and stop ring 75 extending radially therefrom. Stop ring 75 is adapted to engage cylinder head 12 to prevent over-insertion of bushing 72 in threaded bore 70. Double ended stud 74 is disposed within internal cylindrical opening 73 of bushing 72 and includes a first threaded end 76 adapted to engage internally threaded union nut 48 to provide a positive terminal for heating element 26. Insulator bushing 82 isolates double ended conducting stud 74 from threaded bushing 72.

As best seen in FIG. 1, the connection of second portion 43 to first portion 41 is performed by first inserting first end 76 of double ended stud 74 through insulator bushing 82 and placing insulator bushing 82 and double ended stud 74 into internal cylindrical opening 73 in bushing 72. Next, bushing 72 is threadably connected to threaded aperture 70 until stop ring 75 contacts cylinder head 12. The connection is finalized by coupling first end 76 of double ended stud 74 to second end 78 of internally threaded union nut 48 (FIG. 3). Power is then supplied to heating element 26 through terminal assembly 39 by connecting second end 80 of double ended stud 74 to power source 29.

The electric circuit is completed through grounding means which, in the preferred embodiment, include tab projection 92 formed on perimeter mounting member 18 and having a threaded aperture 96 sized to accommodate threaded grounding bolt 98 which secures grounding strap 100 to perimeter mounting member 18. Grounding strap 100 is, in turn, connected to a point having ground potential such as a portion of the cylinder head or engine block (not shown).

In operation, airflow enters cylinder head 12 through inlet means 102 which is formed in cover plate 14 and connected to air intake manifold effluent connector 104. The heretofore disclosed heating device is adapted to cooperate with sensor/controller or manual switching mechanisms known in the art such that an electric current either continuously or selectively flows from power source 29 to terminal assembly 39. The current enters heating element 26 through first end 28, exits heating element 26 through second end 30, passes into frame 16 and ultimately to ground through ground strap 100. Heating element 26 is heated by the electric current passing therethrough and, in turn, heats the air entering cylinder head 12.

Alternative embodiments are illustrated in FIGS. 4, 5 and 6–9 wherein the low profile heating device is shown to include two heating elements connected in parallel or series. The heating devices shown in FIGS. 4–9 include a plurality of substantially identical members referenced in the drawings by substantially identical alphanumeric characters. FIGS. 4 and 5 show a heating device 10 including frame 16, perimeter mounting member 18 and a first heating element 226a connected in series with a second heating element 226b by coupling means 283. First end 228a of first heating element 226a is connected to terminal assembly 39 substantially as shown in FIGS. 1–3. Second end 230a of first heating element 226a is connected to first end 228b of second heating element 226b by coupling means 283 and second end 230b is connected to grounded frame 16 at transverse support member 224.

As is shown in detail in FIG. 5, coupling means 283 cooperates with aperture 284 formed in side wall 20 of frame 16 to connect first and second heating elements 226a and 226b. Coupling means 283 further includes a threaded bolt 285 cooperatively engaging an internally threaded nut 286, insulating washers 287 and a flat or lock washer 288. Coupling means 283 both structurally and electrically connects first and second heating elements 226a and 226b while electrically isolating frame 16 therefrom.

In operation, an electric current passing through terminal assembly 39, enters first end 228a of first heating element 226a and passes therethrough to second end 230a. Coupling means 283 allows the current to pass from first element 226a to second element 226b while insulating washers 287 prevent the current from passing to grounded frame 16. The current continues into second heating element 226b through first end 228b and passes to transverse support member 224 of frame 16 through second end 230b.

Another embodiment of the heating device is shown in FIGS. 6–9 wherein a first heating element 326a and a second heating element 326b are connected in parallel. To accommodate this arrangement, a jumper bar 327 connects terminal assembly 39 to coupling means 383. Further, heating elements 326a and 326b are each connected to frame 16 by connecting means 406.

As shown in FIGS. 6 and 7, terminal assembly 39 includes a first portion 41 adapted to receive and convey an electric current to jumper bar 327 as previously described. The structure shown in FIG. 7 is substantially the same as that disclosed and discussed previously with respect to FIG. 3. However, jumper bar 327 interconnects threaded bolt 40 of first portion 41 to coupling means 383 as best seen in FIG. 6. Coupling means 383 passes the electric current from jumper bar 327 to heating elements 326a and 326b.

As detailed in FIG. 8, coupling means 383 cooperates with an aperture 325 formed in transverse support member 324. Insulating material 402 and insulating washers 403 electrically isolate a threaded bolt 401 from transverse support member 324. First end 328a of first heating element 326a and first end 328b of second heating element 326b are connected to coupling means 383 and electrically connected to jumper bar 327 as shown. Coupling means 383 further includes a flat or lock washer 404 and an internally threaded nut 405 which cooperates with threaded bolt 401 to secure coupling means 383. As will be appreciated by those skilled in the art and as heretofore described, a power source is connected to terminal assembly 39 thereby providing an electric current which passes through terminal assembly 39, jumper bar 327 and coupling means 383. Coupling means 383 conveys the electric current from jumper bar 327 to first and second heating elements 326a and 326b. The current then passes through heating elements 326a and 326b and connecting means 406 and into grounded frame 16.

Connecting means 406 is shown in FIG. 9 to include a threaded bolt 385 cooperatively engaging a bore 384 formed in side wall 20. Connecting means 406 further includes an internally threaded nut 386, washers 387 and flat or lock washer 388. Second end 330b of second heating element 326b is shown coupled to connecting means 406 thereby allowing current to pass from second heating element 326b into grounded frame 16.

The novel low profile heating device disclosed herein provides an efficient heating mechanism adapted to be disposed in the cylinder head of an internal combustion engine. The heating device reduces concerns relating to short circuiting and gasket aging without significantly increasing the distance between engine parts located above and below the heater.

Various other advantages and modifications will become apparent to one skilled in the art after having the benefit of studying the teachings of the specification, the drawings and the following claims.

What is claimed is:

1. A heating device for use in an internal combustion engine comprising:

a frame including connecting means for attaching said frame to an engine and a recessed body portion having an aperture;

an electric heating element coupled to said frame;

a terminal assembly connected to said heating element for conducting an electric current thereto, said terminal assembly passing through said aperture in said recessed body portion, said terminal assembly including a first portion connected to said heating element and a second portion removably engageable with said first portion, said second portion being disposable through an opening in the engine for engagement with the first portion of the terminal assembly; and grounding means electrically connected to said heating element.

2. The heating device of claim 1 wherein said heating element has a first end and a second end, wherein said first portion of said terminal assembly is electrically connected to said first end of said heating element and wherein said second end of said heating element is electrically connected to said grounding means.

3. The heating device of claim 2 wherein said first portion of said terminal assembly includes a bolt and a union nut cooperating to connect said first end of said heating element to said frame, a plurality of insulators arranged to electrically isolate said bolt from said frame, and wherein said second portion of said terminal assembly includes a double ended stud connected to said union nut and a power source.

4. The heating device of claim 3 wherein said grounding means includes a grounding strap coupled to said frame by a threaded bolt.

5. The heating device of claim 1 wherein said recessed body portion of said frame includes side walls having an upper edge and a lower portion, and wherein said connecting means includes a perimeter mounting member extending substantially perpendicularly from said upper edge of said side walls.

6. The heating device of claim 5 wherein said connecting means further includes a plurality of mounting bolts and wherein said perimeter mounting member includes a plurality of passages sized to cooperatively engage said mounting bolts whereby said frame is attached to the cylinder head of an internal combustion engine.

7. The heating device of claim 6 wherein said recessed body portion includes hubs projecting from said side walls to form a C-channel and wherein said heating device further includes a C-shaped mounting element disposed within said C-channel, said C-shaped mounting element having insulating members associated therewith and said insulating members connected to said heating element.

8. The heating device of claim 1 further including a second heating element and coupling means for connecting said heating elements in series.

9. The heating device of claim 1 further including a second heating element and coupling means for connecting said heating elements in parallel.

10. A heating device for use in an internal combustion engine comprising:

a parallelepiped shaped frame including side walls having an upper edge and a lower portion, at least one of said side walls having an aperture formed therein and a flange connected to an upper edge of the side walls and extending perpendicularly therefrom;

a heating element connected to said frame;

a terminal assembly including a first portion connected to a first end of the heating element and a second portion removably engageable with said first portion whereby said heating device may be placed into recessed engagement with a cylinder head and whereby said second portion connects a battery to said first portion through an opening formed in the cylinder head; and grounding means electrically connected to said second end of said heating element.

11. The heating device of claim 10 wherein said first portion of said terminal assembly is disposed within an area bounded by said side walls.

12. The heating device of claim 11 wherein said frame includes at least one transverse support member connecting said side walls and a vertical support member projecting perpendicularly from at least one of said at least one transverse support members and wherein said first portion of said terminal assembly includes a bolt sized to cooperatively engage an opening formed in said vertical support member and threaded to removably engage a first end of a union nut, a plurality of insulators arranged to electrically isolate said bolt from said vertical support member.

13. The heating device of claim 12 wherein said second portion of said terminal assembly includes a double ended stud having a first end coupled to a second end of said union nut and a second end connected to a power source whereby an electric current is conveyed to said heating element.

14. The heating device of claim 13 wherein said grounding means includes a first bolt having a head and a threaded body adapted to cooperate with a threaded passage formed in said at least one transverse support member to connect said second end of said heating element to said at least one transverse support member and a ground strap coupled to said frame by a second threaded bolt.

15. The heating device of claim 10 further including a second heating element and coupling means for connecting said heating elements in series.

16. The heating device of claim 10 further including a second heating element and coupling means for connecting said heating elements in parallel.

17. A system for heating the airflow entering the cylinder head of an internal combustion engine, said system comprising:

a cylinder head having a threaded bore and an intake opening;

a heating device including a frame removably engaging said intake opening, an electric heating element coupled to said frame, a terminal assembly connected to said heating element and a power source, said frame including a perimeter mounting member having an upper surface and a lower surface and a recessed body portion having an aperture formed therein, said lower surface of said perimeter mounting member supported by said cylinder head, said recessed body portion extending substantially perpendicularly from said perimeter mounting member and into said intake opening, said terminal assembly having a first portion connected to said heating element and a second portion removably engaged with said first portion and extending through said aperture in said recessed body portion and through said threaded bore in said cylinder head;

a cover plate having an inlet means for receiving airflow, said cover plate supported by said upper surface of said perimeter mounting plate;

a first gasket disposed between said upper surface of said perimeter mounting member and said cover plate;

a second gasket disposed between said lower surface of said perimeter mounting member and said cylinder head;

securing means for coupling said cover plate, said first gasket, said heating device and said second gasket to said cylinder head; and grounding means electrically connected to said heating element.

18. The heating system of claim 17 wherein said grounding means includes a tab projection formed integrally with said perimeter mounting member, said tab projection having a threaded orifice formed therein, a grounding strap having a first end and a second end, a grounding bolt sized to engage said orifice and said first end of said ground strap, said second end of said grounding strap electrically connected to an engine element having ground potential.

19. The heating system of claim 17 wherein said securing means include a plurality of apertures formed in said gaskets, cover plate and perimeter mounting member, a plurality of threaded blind bores formed in said cylinder head and a plurality of threaded bolts sized to cooperatively engage said apertures and threadably engage said blind bores.

20. The heating system of claim 17 wherein said first portion of said terminal assembly includes a bolt cooperating with an orifice formed in said frame whereby said heating element is coupled to said frame, a plurality of insulators arranged to electrically isolate said bolt from said frame, said bolt removably engaging a first end of an internally threaded union nut and wherein said second portion of said terminal assembly includes a double ended stud having a first end threadably engaging a second end of said union nut and a second end connected to a power source whereby an electric current passes from said power source to said heating element.

21. The heating device of claim 17 further including a second heating element and coupling means for connecting said heating elements in series.

22. The heating device of claim 17 further including a second heating element and coupling means for connecting said heating elements in parallel.

23. A method of heating air entering a cylinder head of an internal combustion engine comprising the steps of:

forming an intake opening and a bore in a cylinder head, said intake opening having a perimeter;

placing a first gasket on said cylinder head adjacent to the perimeter of said intake opening;

placing a heating device within said intake opening, said heating device including a frame and an electric heating element coupled thereto, said frame comprised of a perimeter mounting member having an upper surface and lower surface and a recessed body portion extending perpendicular from said perimeter mounting member, an aperture formed in said recessed body portion, said intake opening sized to accommodate said recessed body portion and to cooperate with said lower surface of said perimeter mounting member whereby said frame is supported by said cylinder head;

connecting a power source to said heating element by passing a portion of a terminal assembly through said bore in the cylinder head and the aperture formed in said recessed body of said frame;

placing a second gasket on said upper surface of said perimeter mounting member;

placing a cover plate having inlet means for receiving airflow on said second gasket;

securing said cover, said first and second gaskets and said heating device to said cylinder head;

connecting an intake hose to said inlet means; and grounding said electric heating element.

* * * * *